United States Patent [19]

Huebscher et al.

[11] Patent Number: 5,042,902

[45] Date of Patent: Aug. 27, 1991

[54] OPTICAL FIBER SPLICE AND METHOD OF USE

[75] Inventors: Laszlo Huebscher, New Brunswick, N.J.; Carmen Lanzetta, Horsham, Pa.

[73] Assignee: Advanced Custom Applications, Inc., Belle Mead, N.J.

[21] Appl. No.: 437,941

[22] Filed: Nov. 16, 1989

[51] Int. Cl.$^5$ .............................................. G02B 6/38
[52] U.S. Cl. ........................................ 385/72; 385/95
[58] Field of Search ........................... 350/96.21, 96.2

[56] References Cited

U.S. PATENT DOCUMENTS

| | | | |
|---|---|---|---|
| 4,179,186 | 12/1979 | Tynes | 350/96.21 |
| 4,339,172 | 7/1982 | Leather | 350/96.21 |
| 4,717,233 | 1/1988 | Szkaradnik | 350/96.21 |
| 4,729,625 | 3/1988 | Loscoe et al. | 350/96.21 |
| 4,730,892 | 3/1988 | Anderson et al. | 350/96.21 |
| 4,832,440 | 5/1989 | Anderton | 350/96.21 |
| 4,929,046 | 5/1990 | Barlow | 350/96.21 |
| 4,940,307 | 7/1990 | Aberson et al. | 350/96.21 |

Primary Examiner—John D. Lee
Assistant Examiner—John Ngo
Attorney, Agent, or Firm—Blum Kaplan

[57] ABSTRACT

A device and method of use for splicing the free ends of a pair of optical fibers together. The device comprising a two-section housing and a capillary tube. One section of the housing includes a pair of groove supports and a recess for receipt of the capillary tube. The other section includes a pair of cantilevered arms. Each support groove is disposed adjacent a respective end of the capillary tube and aligned with a longitudinally extending portion of the passageway extending through the capillary tube. The cantilever arms are disposed over the respective support grooves to form respective spaces through with the free ends of the optical fibers may be passed to guide the fibers into the capillary tube passageway where they abut each other. The cantilever arms hold the fibers securely in the support grooves. An ultraviolet-ray-activated, index matched, adhesive is provided in the housing before the fibers are inserted so that when the fibers are inserted they may readily slide into the capillary tube to abut each other. Then the adhesive is activated to cause it to set to encapsulate and lock the various components of the splice in place against disconnection.

24 Claims, 3 Drawing Sheets

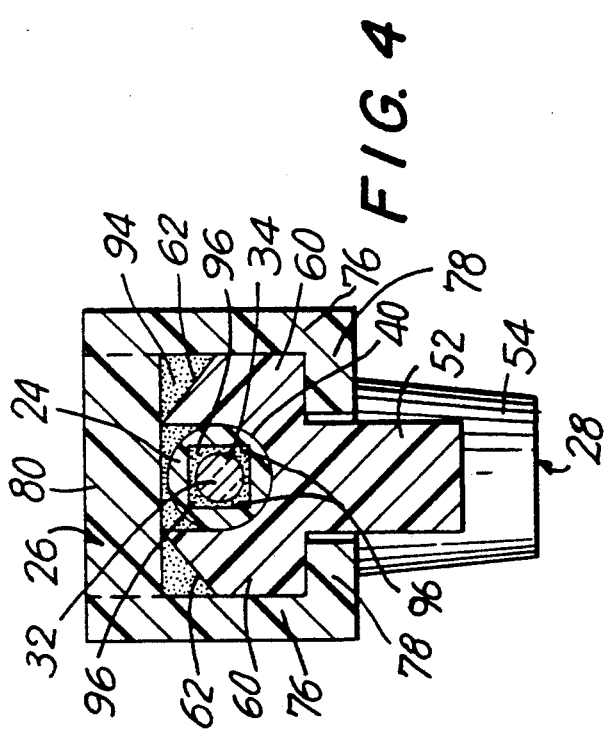
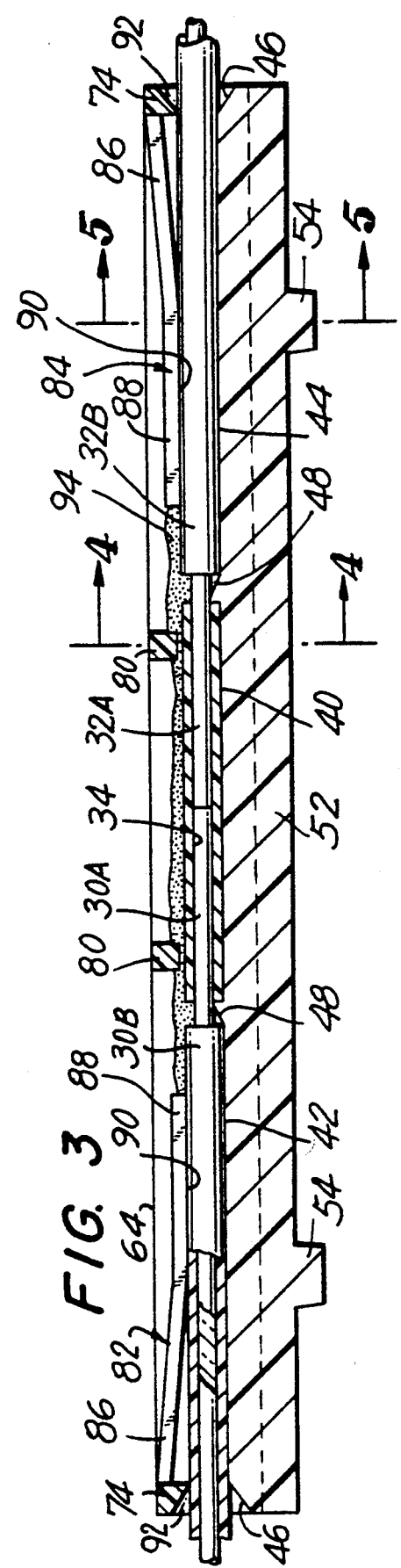

OPTICAL FIBER SPLICE AND METHOD OF USE

BACKGROUND OF THE INVENTION

This invention relates generally optical fibers and more particularly to devices and methods of use for splicing then ends of a pair of optical fibers together.

Optical fibers are widely employed and are optical waveguides with an inner glass core having a refractive index which exceeds that of a surrounding cladding layer and are capable of conducting an optical ray by means of total internal reflection or guiding.

Optical fibers have been widely employed in the communications field and are employed in various other systems as well. It is apparent that an optical fiber is a glass light conducting guide of a given length and of extremely small diameter frequently must be connected (spliced) to the end of a similar fiber to enable it to serve as a system component. In this manner various optical fibers or optical links can be connected to other optical fibers or optical links for the efficient transmission of light.

Due to the extremely small dimensions regarding the cross sectional areas of any optical fiber the splicing of such fibers to one another so that the fibers are precisely aligned axially to minimize losses is of considerable importance. Various devices or assemblies have been proposed and used to achieve such splices. In this connection the patent literature discloses various devices/components for effecting the splicing of optical fibers, such as, U.S. Pat. Nos. 4,077,702 (Neuried et al), 4,179,186 (Tynes), 4,325,607 (Carlsen), 4,647,150 (DeSanti et al), 4,763,970 (Berkey), 4,784,456 (Smith), 4,810,277 (Waitl et al), 4,818,059 (Kakii et al), and 4,850,670 (Mathis et al). In addition various splices are commercially available. For example, AT&T markets "Enhanced Rotary Mechanical Splices", "Silicon Chip Array Splices", and "Rapid Ribbon Splices". GTE markets "Elastomeric Mechanical Fiber Optic Splices". 3M markets "Fiberlok Optical Fiber Splices", and Norland Products, Inc. markets "UVC Optic Splices".

While the prior art splicing devices/components are generally suitable for their intended purposes, they nevertheless suffer from one or more of the following disadvantages, e.g., difficulty to use, complexity of constuction, large size, expensive, effectiveness, etc.

OBJECTS OF THE INVENTION

Accordingly, it is a general object of this invention to provide apparatus and a method for use for splicing the ends of a pair of optical fibers which overcomes the disadvantages of the prior art.

It is another object of the present invention to provide a device which is easy to use and effective for splice the ends of optical fibers together.

It is still another object of the present invention to provide a device for splicing the ends of optical fibers together which is simple in construction, compact in size, and relatively low in cost.

SUMMARY OF THE INVENTION

These and other objects of the instant invention are achieved by providing a device and method of use for splicing the free end of a first optical fiber to the free end of a second optical fiber, with each of the optical fibers being of a predetermined diameter. The device basically comprises a housing and a capillary tube disposed therein. The capillary tube comprises an elongate member having a longitudinal passageway extending therethrough. The passageway's width is approximately the same as the optical fiber diameter.

The housing also comprises first and second support surfaces, and first and second pressure applying members. The first support surface is disposed adjacent one end of the capillary tube and aligned with a longitudinally extending portion of the passageway, and the second support surface is disposed adjacent the other end of the capillary tube and aligned with the longitudinally extending portion of the passageway. The first support surface is arranged to support a first portion of the first optical fiber and with the free end of the first optical fiber extending into the capillary tube's passageway. The second support surface is arranged to support a second portion of the second optical fiber, with the free end of the second optical fiber extending into the capillary tube's passageway so that the free ends of both optical fibers abut.

The first pressure applying member is arranged to hold the first portion of the first optical fiber securely onto the first support surface and the second pressure applying member is arranged to hold the second portion of the second optical fiber securely onto the second support surface so that the abutting fiber ends don't slip out of engagement with each other.

This method of forming the splice comprises the steps of inserting the free end of the first optical fiber into the housing so that it slides across the first support surface and enters into the aligned capillary tube passageway. The first pressure applying member holds the optical fiber thereunder as it slides along the first support surface and into the capillary tube passageway. The free end of the second optical fiber is inserted into the housing so that it slides across the second support surface and enters into the aligned capillary tube passageway and abuts the free end of the first optical fiber. The second pressure applying member holds the optical fiber thereunder as it slides along the second support surface, into the capillary tube passageway and into abutment with the free end of the first optical fiber.

In accordance with one preferred aspect of the device and one method of use an ultraviolet-ray-activated adhesive is provided to lock various components of the splice together. In particular, the adhesive is applied in the housing before the optical fiber ends are introduced therein so that when they are inserted they carry the adhesive into the capillary tube's passageway. The adhesive is exposed to ultraviolet rays to cause it to cure, thereby locking the various components together.

DESCRIPTION OF THE DRAWING

FIG. 3 is an enlarged sectional view taken along lines 3—3 of FIG. 1;

FIG. 4 is an enlarged sectional view taken along lines 4—4 of FIG. 3; and

DETAILED DESCRIPTION OF THE PREFERRED EMBODIMENT

Figure 1:
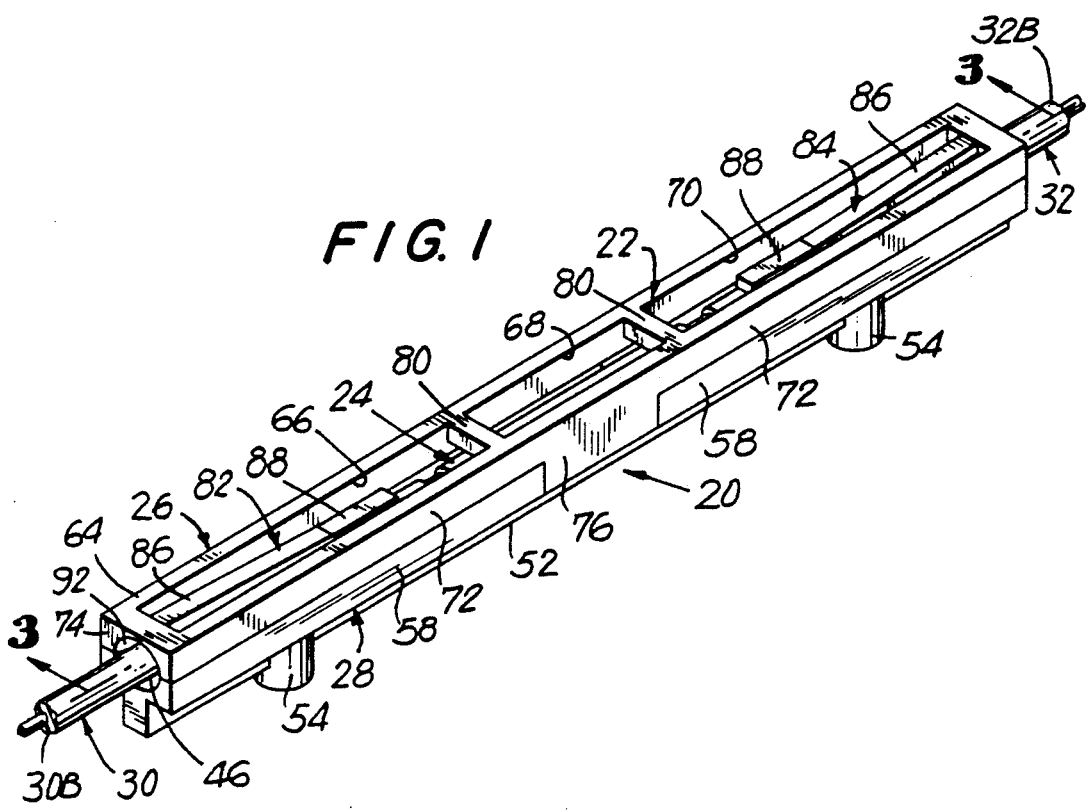
FIG. 1 is a perspective view of a splice device constructed in accordance with this invention having joined the free ends of a pair of conventional optical fibers.
Figure 5:
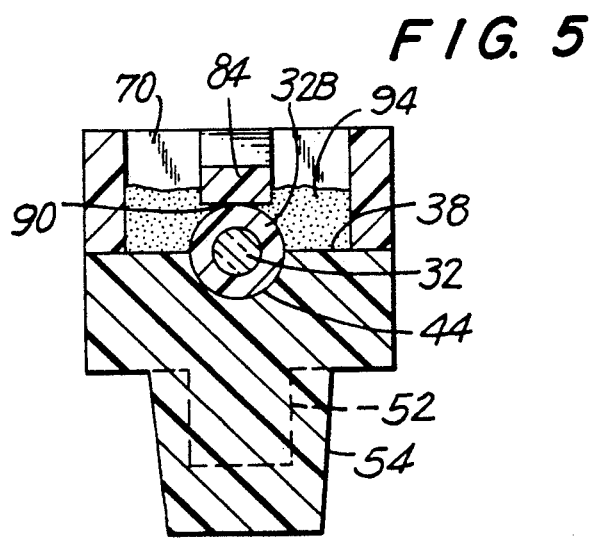
FIG. 5 is an enlarged sectional view taken along lines 5—5 of FIG. 3.

Referring now to various figures of the drawing where like reference numerals refer to like parts there is shown at 20 in FIG. 1 one embodiment of the splice device of the subject invention.

Figure 2:
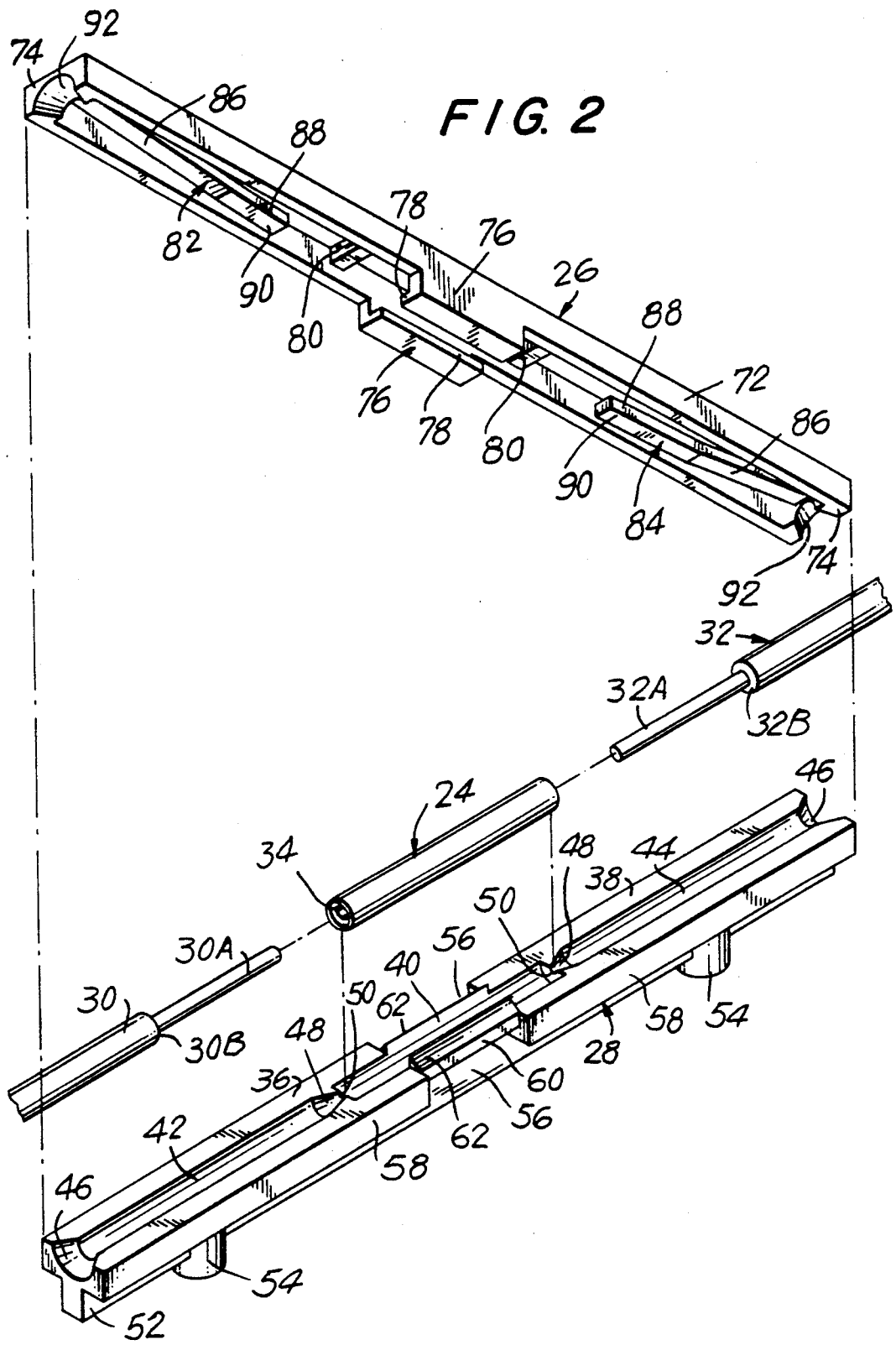
FIG. 2 is an exploded perspective view of the splice device shown in FIG. 1.

As clearly shown in FIGS. 1 and 2 the device 20 basically comprises a housing assembly 22 and a capillary tube 24. The housing assembly is in the form of a pair of sections 26 and 28. The section 26 forms an upper section or cover for the assembly while the section 28 forms a lower section or base. Both sections are formed of a suitable material, e.g., plastic, and are preferably molded.

As will be described in detail later, the lower section 28 includes a recess therein for receipt of the capillary tube, and the two sections 26 and 28 are arranged to be snap-fit together to hold the capillary tube therein. Once so assembled, the assembly 22 is arranged to receive from opposite ends thereof the free ends 30A and 32A of a respective a pair of optical fibers 30 and 32 to be joined, i.e., spliced, together.

The optical fibers 30 and 32 are each of conventional construction (either single mode or multimode) and include a central core of glass, with a glass cladding thereon. The fibers may be of any suitable size, e.g., 125-1000 microns in diameter. A plastic coating or buffer 30B and 32B covers the fibers 30 and 32, respectively, to protect them. The plastic buffers 30B and 32B may be of any suitable thickness, e.g., 500-1000 microns.

In order to splice the free ends of the fibers together in a good light-transmissive, low loss interface the plastic buffer at the free ends 30A and 32A must be removed to leave the fibers bare, as will be described later. Once the buffer is removed from each of the free ends of the optical fibers those fibers are inserted into the assembly 22 from opposite ends thereof until they meet (abut) in the good, light transmissive interface within the capillary tube 24.

In accordance with one preferred aspect of the invention, the abutting fiber ends are locked into position within the capillary tube by an adhesive so that the splice is permanent. However, for some applications, e.g., laboratory applications, it may be desired that the splice be temporary (disconnectable). Thus, for those applications no adhesive is used. However, if desired, an optical index matched gel can be located at the interface of the abutting fiber ends to prevent any light from leaking out of the interface and to facilitate light transmission between the fiber ends. Otherwise the interface may be left dry.

The sections 26 and 28 of the housing assembly 22 include various components (to be described in detail later) for facilitating the insertion of the optical fiber ends into the capillary tube and for holding them in place therein. That holding feature is of considerable importance whether or not an adhesive is used to make the splice. In this regard if an adhesive is used to make a permanent splice the components of the assembly 20 holding the fibers-in place ensure that the fiber ends do not separate before the adhesive has set. If no adhesive is used, i.e., the splice is temporary, the components holding the fiber ends in place are of perhaps more importance to ensure that the integrity of the splice is maintained until it is desired to be disconnected.

As can be seen clearly in FIGS. 2, 3 and 4, the capillary tube 24 is an elongated member, preferably formed of glass, and having a central passageway 34 extending completely therethrough. The outer periphery of the capillary tube is circular in cross-section. The passageway 34, however, is not circular. Rather, it is polygonal, i.e., has three or more sides, in cross-section for reasons to be described later. In accordance with the preferred embodiment of the invention shown herein the passageway's cross-section is square (See FIG. 4), with the spacing between the opposed walls forming the passageway 34 being just slightly larger than the external diameter of the bare optical fiber, i.e., the optical fiber without the buffer. Moreover, the open ends of the passageway 34 are flared (conical in shape). Accordingly, the bare free end portions of the optical fibers can be readily slid into the capillary tube's passageway 34 so that they abut each other.

As shown in FIGS. 2-5, the base section 28 of the housing assembly 22 basically comprises an elongated member having a pair of planar top surfaces 36 and 38, each disposed at respective opposite ends thereof, with a recess 40 (FIG. 2) disposed therebetween. The recess is arranged to receive the capillary tube 24 and is thus of semi-circular cross-section, with its diameter being just slightly larger than that of the capillary tube, and with its length also being just slightly larger than the capillary tube. The top surfaces 36 and 38 include respective longitudinally extending grooves 42 and 44 in them. Each groove is arranged to receive and guide a respective optical fiber therethrough to facilitate the insertion of that optical fiber's free end into the passageway in the capillary tube. Thus, each longitudinally extending groove is semi-circular in cross-section and of a diameter just slightly larger than that of the plastic buffer coated optical fiber. The outer end 46 of each groove 42 and 44 is flared to cooperate with a similar flare in an associated end wall of the cover 24 (to be described later) to form an enlarged mouth or opening into which the optical fiber can be inserted when the sections 26 and 28 are assembled. The inner end 48 of each groove 42 and 44 is semi-conical in shape and tapers downward to a semi-circular recess 50 axially aligned with the central longitudinal axis of the capillary tube's passageway. The radius of the recess 50 is just slightly larger than that of the optical fiber without the buffer coating. Accordingly, when an optical fiber is inserted in either groove 42 and 44 and slid therealong toward the capillary tube 24, the bare free end portion of that fiber will be guided by the recess 50 into the axially aligned passageway 34 of the capillary tube.

A strengthening rib 52 extends along the underside of the base section 28 and includes plural reinforcing tabs 54 projecting downward therefrom.

The base section 28 also includes a pair of undercut locking recesses 56 located in respective sidewalls 58 of the section at the middle thereof, i.e., at the location of the capillary tube receiving recess 40. The locking recesses 56 are located under respective over-hanging portions 60 of the sidewalls 58. The upper surface of each over-hanging portion 60 is inclined downward to form a cam surface 62 arranged to cooperate with respective ones of a pair of locking tabs, to be described later, of the top section 26 to secure the sections 26 and 28 together.

As can be seen in FIGS. 1, 2 and 4, the top section 26 of the housing assembly 22 is an elongated member whose top wall 64 includes three openings or windows 66, 68 and 70 therein. A pair of sidewalls 72 project downward from the top wall on opposite sides thereof, and a pair end walls 74 project downward from the top wall at opposite ends thereof. A pair of locking tabs 76 project downward from the sidewalls 72 at the position of the central window 68. Each tab 76 terminates in an inwardly projecting flange 78. Each flange 78 forms a latch which is arranged to slide downward over inclined surface 62 of the base 28 to spread the tabs apart so that they may snap-fit into engagement with respective locking recesses 56 disposed thereunder, to thereby secure the two sections 26 and 28 together.

The underside of the top wall 64 of the top section 26 includes a pair of transverse walls 80, each of which includes an lower surface which, if desired, may engage a respective portion of the capillary tube when the assembly 22 is snap-fit together to prevent the capillary tube from moving in the recess 40. It may, however, be desired that the capillary tube be permitted to move slightly within the recess 40 in order to facilitate the entry of the optical fiber ends into the capillary tube's passageway. In such a case the lower surfaces of walls 80 are spaced sufficiently from groove 40 so that they do not engage the periphery of the capillary tube disposed therein.

As shown clearly in FIGS. 1-3 the top section 26 also includes a pair of pressure applying members in the form of respective cantilever beams 82 and 84. The beams are elongated, finger-like members which project inward from respective end walls 74 of the top section. Each of the beams 82 and 84 includes an intermediate portion 86 projecting downward from the inner surface of the end wall 74 at a slight angle, e.g., 9°, to the top wall 64 and terminating in a free end portion 88. Each free end portion 88 is biased so that it normally extends downward at a slight angle, e.g., 2°, to the plane of the base wall portions 36 and 38 when the two sections are snap-fit together but before introduction of the optical fibers therein. Each of the cantilever beams 82 and 84 extends parallel to the longitudinal central axis of the housing assembly 22 so that when the two sections 26 and 28 are snap-fit together the free end portion 88 of each beam extends along and over the longitudinal groove 42 or 44 which is disposed thereunder to form a respective tapering space therebetween. The bottom surface of each of the free ends portions 88 is designated by the reference numeral 90 and serves as an engagement surface to engage the optical fiber cladding adjacent the bare free end of the fiber disposed thereunder.

As can be seen clearly in FIGS. 2 and 3, each end wall 74 of the cover 26 includes a flared recess 92 tapering downward from the outside surface of the end wall to the inside surface. Each recess 92 cooperates with an associated flared recess 46 in the bottom section when the sections are secured together to form a respective tapered access mouth into which the free end of a respective fiber is inserted.

In order to prepare optical fibers for introduction into the splice assembly 22, each optical fiber is striped of its plastic buffer for approximately a 4" (10 cm) from its free end, and then the bare free end of the fiber is cleaved so that it is planar, perpendicular to its longitudinal central axis, and smooth, with the bare free end extending no more than approximately 6 mm from the end of the cladding. Once the two fibers 30 and 32 are so prepared they may then be introduced into the housing assembly 22 to complete the splice.

If the splice is to be permanent, prior to the introduction of the optical fibers into the housing assembly 22, a few drops of a liquid adhesive 94 is placed into the housing by use of a syringe (not shown). In particular, a drop or two of the adhesive 94 is injected through window 66 into the groove 42 disposed there-below, a drop or two of adhesive 94 is injected through window 70 into the groove 44 therebelow, and a drop or two of adhesive 94 is injected through window 68 to engage peripheral portions of the capillary tube and any abutting portions of the cover section 26.

The assembly 22 is now ready to receive the free ends of the fibers 30 and 32 from opposite ends thereof. Thus, the optic fiber 30 with its bare free end portion 30A is introduced into the mouth at one end, e.g., the left side end, of the assembly 22. The fiber is then slid along in the groove 42, with the adhesive 94 within the groove 42 serving to center the fiber while also reducing friction. As the bare free end of the fiber passes down the groove toward the capillary tube 24 it is not engaged by the surface 90 at the free end portion 88 of the cantilever arm 82, i.e., the space between that surface and the underlying groove 42 is wider than the diameter of the bare free end 30A of the fiber. Once the bare free end 30A reaches the tapered recess 48 it is guided into recess 50 and hence into the immediately adjacent flared open end of the central passageway 34 in the capillary tube. As the fiber 30 is further pushed into the capillary tube 24, its free end 30A carrys with it some of the adhesive 94 from the groove 42.

It should be noted that at the point at which the fiber's free end 30A enters the capillary tube 24 the engagement surface 90 of the cantilever beam 82 rides up into contact with the cladding 30B on the fiber 30. This causes the free end portion 88 of the cantilever beam 82 to flex against its natural bias, thereby applying downward pressure on the portion of the fiber disposed thereunder. The bias force applied by the beam is not so great as to impede the fiber from being slid further into the capillary tube, but is sufficient to prevent it from accidentally sliding out.

Once the free end of the fiber 30 has been pushed into the capillary tube 24 to approximately the middle of it, the other optical fiber 32 is introduced into the assembly 22 in a similar manner. Thus, the bare free end 32A of the fiber 32 is introduced through the flared mouth at the opposite end of the assembly 22 and into the aligned groove 44. The fiber is then slid along that groove in the same manner as described heretofore so that its free end 32A picks up the adhesive 94 and carries that adhesive into the central passageway 34 of the capillary tube.

By virtue of the fact that the central passageway 34 of the capillary tube is square in cross-section four interstitial spaces 96 are produced between the outer periphery of the bare optical fiber ends 30A and 32A and the planar walls making up the capillary tube's passageway. These interstitial spaces 96 serve to vent any air from the central passageway as the fibers are inserted therein. For example, as the second fiber 32 is inserted into the capillary the air (and possibly some of the adhesive) is enabled to vent through the interstitial spaces 96. This action insures that the two fiber ends 30A and 32A abut each other in a good, light-transmissive joint. To further insure that the joint is light tight, i.e., to prevent any light from leaking out of the interface and to facilitate light transmission therebetween, the UV activated adhesive is optically (index) matched to the fibers.

It should be pointed out at this juncture that any conventional UV actuated adhesive that is index matched to the fibers and which has other required properties, i.e., operating temperature, cure time, etc., may be used. Examples of such adhesives are NORLAND NOA-61 and NOA-81 sold by Norland Products, Inc. of New Brunswick N.J., or ELECTRO-LITE ELC4481 sold by Electro-Lite Corp. of Danbury Conn.

As should be appreciated from the foregoing, the cantilever arms 82 and 84 hold the underlying portions of the optical fibers against accidental sliding displacement. As discussed earlier this action is of considerable importance during the assembly process of a permanent splice to insure that the fiber ends do not separate before the adhesive sets or cures. The curing or setting of the adhesive is effected by exposing the assembly 22 with the abutting fibers therein to ultraviolet light. The windows 66, 68 and 70 provide openings through which the ultraviolet light can pass to impinge the adhesive 94.

After the adhesive has cured the splice is completed and is permanent, with the housing assembly 22 providing reinforcement to prevent the accidental separation of the optical fibers.

As should be appreciated from the foregoing, the device 20 of the subject invention is simple in construction, can be manufactured at relatively low cost, is easy to use and is effective for quickly and easily producing either a permanent or a temporary splice between two conventional optical fibers.

Without further elaboration the foregoing will so fully illustrate our invention that others may, by applying current or future knowledge, adopt the same for use under various conditions of service.

We claim:

1. A device for splicing the free end of a first optical fiber to the free end of a second optical fiber, each of said optical fibers being of a predetermined diameter, said device comprising housing means, said housing means including a first body portion and a second body portion, securing means integrally formed on at least one of said first body portion or said second body portion for selectively securing said first body portion to said second body portion, a capillary tube disposed within said housing means said capillary tube comprising an elongated member having a longitudinal passageway extending therethrough, said passageway being of a width approximately the same as said optical fiber diameter, said housing means also comprising first and second support surfaces, and first and second pressure applying members, said first support surface being disposed adjacent one end of said capillary tube and aligned with a longitudinally extending portion of said passageway, said second support surface being disposed adjacent the other end of said capillary tube and aligned with said longitudinally extending portion of said passageway, said first support surface being arranged to support thereon a first portion of said first optical fiber, and with the free end of said first optical fiber extending into said capillary tube passageway, said second support surface being arranged to support thereon a second portion of said second optical fiber, and with the free end of said second optical fiber extending into said capillary tube passageway so that said free ends abut therein, said first pressure applying member being arranged to hold said first portion of said first optical fiber securely onto said first support surface and said second pressure applying member being arranged to hold said second portion of said second optical fiber securely onto said second support surface when said first body portion is secured to said second body portion so that said abutting optical fiber ends remain in engagement with each other.

2. The device of claim 1 additionally comprising adhesive means for securing said abutting optical fiber ends within said passageway and for securing said first and second optical fiber portions with respect to said pressure applying means and said first and second support surfaces.

3. The device of claim 2 wherein said adhesive comprises an ultraviolet-ray-activated adhesive which is index matched to said optical fibers.

4. The device of claim 1 wherein each of said pressure applying means comprises a biased beam having an elongated engaging surface which is disposed over a respective one of said first and second support surfaces to form a space adapted to receive the free end portion of a respective one of said first and second optical fibers, with each of said engaging surfaces being arranged to engage respective first and second portion of said optical fibers as said optical fibers enter said space.

5. The device of claim 4 wherein each of said support surfaces comprises an elongated groove.

6. The device of claim 1 wherein each of said support surfaces comprises an elongated groove.

7. The device of claim 6 wherein each of said pressure applying means comprises a biased beam having an elongated engaging surface which is disposed over a respective one of said first and second support surfaces to form a space adapted to receive the free end portion of a respective one of said first and second optical fibers, with each of said engaging surfaces being arranged to engage respective first and second portions of said optical fibers.

8. The device of claim 7 wherein each of said support surfaces comprises an elongated groove, each of said grooves being located opposite a respective one of said engaging surfaces.

9. The device of claim 8 additionally comprising adhesive means for securing said abutting fiber ends within said passageway and for securing said first and second optical fiber portions with respect to said first and second pressure applying means and said first and second support surfaces.

10. The device of claim 1 wherein the ends of said passageway are flared.

11. The device of claim 1 wherein said housing means is formed with a recess therein for supporting said capillary tube therein.

12. The device of claim 11 wherein each of said support surfaces comprises an elongated groove.

13. The device of claim 12 wherein said first and second body portions are arranged to be snap fit together to secure said first body portion to said second body portion.

14. The device of claim 1 wherein said capillary tube is formed of glass.

15. The device of claim 14 wherein said passageway in said capillary tube is polygonal in cross-section.

16. The device of claim 15 wherein each end of said passageway is flared.

17. A device for splicing the free end of a first optical fiber to the free end of a second optical fiber, each of said optical fibers being of a predetermined diameter, said device comprising housing means and a capillary tube disposed therein, said capillary tube comprising an elongated member having a longitudinal passageway extending therethrough, said passageway being of a width approximately the same as said optical fiber diameter, said housing means also comprising first and second support surfaces, and first and second pressure applying members, said first support surface being disposed adjacent one end of said capillary tube and aligned with a longitudinally extending portion of said passageway, said second support surface being disposed adjacent the other end of said capillary tube and aligned with said longitudinally extending portion of said passageway, said first support surface being arranged to support thereon a first portion of said first optical fiber, and with the free end of said first optical fiber extending into said capillary tube passageway, said second support surface being arranged to support thereon a second portion of said second optical fiber, and with the free end of said second optical fiber extending into said capillary tube passageway so that said free ends abut therein, said first pressure applying member being arranged to hold said first portion of said first optical fiber securely onto said first support surface and said second pressure applying member being arranged to hold said second portion of said second optical fiber securely onto said second support surface so that said abutting optical fiber ends remain in engagement with each other, adhesive means for securing said abutting optical fibers ends within said passageway and for securing said first and second optical fiber portions with respect to said pressure applying means and said first and second support surfaces, said passageway in said capillary tube being polygonal in cross-section to provide interstitial spaces within said passageway when said fiber ends are located therein, a portion of said adhesive being located within said interstitial spaces.

18. The device of claim 17 wherein the ends of said passageway are flared.

19. The device of claim 18 wherein said passageway is square in cross-section.

20. The device of claim 19 wherein said adhesive comprises an ultraviolet-ray-activated adhesive which is index matched to said optical fibers.

21. A device for splicing the free end of a first optical fiber to the free end of a second optical fiber, each of said optical fibers being of a predetermined diameter, said device comprising housing means and a capillary tube disposed therein, said capillary tube comprising an elongated member having a longitudinal passageway extending therethrough, said passageway being of a width approximately the same as said optical fiber diameter, said housing means also comprising first and second support surfaces, and first and second pressure applying members, said first support surface being disposed adjacent one end of said capillary tube and aligned with a longitudinally extending portion of said passageway, said second support surface being disposed adjacent the other end of said capillary tube and aligned with said longitudinally extending portion of said passageway, said first support surface being arranged to support thereon a first portion of said first optical fiber, and with the free end of said first optical fiber extending into said capillary tube passageway, said second support surface being arranged to support thereon a second portion of said second optical fiber, and with the free end of said second optical fiber extending into said capillary tube passageway so that said free ends abut therein, said first pressure applying member being arranged to hold said first portion of said first optical fiber securely onto said first support surface and said second pressure applying member being arranged to hold said second portion of said second optical fiber securely onto said second support surface so that said abutting optical fiber ends remain in engagement with each other, each of said pressure applying means including a biased beam having an elongated engaging surface which is disposed over a respective one of said first and second support surfaces to form a space adapted to receive the free end portion of a respective one of said first and second optical fibers with each of said engaging surfaces being arranged to engage respective first and second portions of said optical fibers and adhesive means for securing said abutting fiber ends within said passageway and for securing said first and second optical fiber portions with respect to said first and second pressure applying means and said first and second support surfaces, said passageway in said capillary tube being polygonal in cross-section to provide interstitial spaces within said passageway when said fiber ends are located therein, a portion of said adhesive being located within said interstitial spaces.

22. The device of claim 21 wherein said passageway is square in cross-section.

23. The device of claim 21 wherein said adhesive comprises an ultraviolet-ray-activated adhesive which is index matched to said optical fibers.

24. The device of claim 1, wherein said first housing means is formed with openings therein, said openings providing access to said capillary tube and said first optical fiber and second optical fiber.

* * * * *